UNITED STATES PATENT OFFICE 2,316,543

CATALYTIC OXIDATION

William J. Amend, Seaford, Del., assignor to E. I. du Pont de Nemours & Company, Wilmington, Del., a corporation of Delaware No Drawing. Application August 13, 1941, Serial No. 406,725

4 Claims. (Cl. 260—537)

This invention relates to catalytic oxidation and more particularly to an improved process for the catalytic oxidation of ketones.

Processes have previously been proposed for the oxidation of ketones such, for example, as described in U. S. Letters Patent 2,005,183, in which it is shown that various ketones may be catalytically oxidized to acids by oxidation of the ketones corresponding to the general formula: $RCOR_1$, in which R denotes an alkyl, cycloalkyl, aralkyl or aryl radical and $R_1$, an alkyl cycloalkyl or aralkyl radical, or in which R and $R_1$ are connected with each other as members of a non-aromatic ring system, the ketones of this general character being subjected to oxidation in the liquid phase by means of an oxygen-containing gas such as oxygen, air or oxygen-enriched air. In the processes previously described such, for example, as those of the Flemming and Speer patent above referred to, there have been further disclosures of various catalysts in the presence of which the oxidation of ketones may be carried on.

It is an object of the present invention to provide a process for the controlled oxidation of ketones, in which processes improved catalysts for the oxidation of ketones are provided.

It is a further object of the invention to provide a new and improved process for the production of adipic acid from cyclohexanone.

Other objects and advantages of the present invention will be apparent by reference to the following specification.

According to this invention, important improvements in yields of acid from the corresponding ketone, over the prior art, may be obtained in the oxidation of ketones by employing a mixture of a manganese salt such as the acetate, propionate, isobutyrate, chloride, nitrate. or the like and a salt of an alkaline earth metal such, for example, as an acetate, propionate, isobutyrate. chloride, nitrate, or the like of barium, strontium, calcium and magnesium. Of the manganese salts, manganese acetate is preferred. Of the alkaline earth metals, barium is preferred and of the alkaline earth metal salts barium acetate is also preferred, though it may be found convenient to use the barium salt of the solvent acid. It may also be found convenient to add the alkaline earth constituent as its oxide or hydroxide to the acid solvents.

Thus, according to the present invention, I have found that by the addition of barium acetate to a manganese acetate catalyst, the apparent yields of adipic acid from cyclohexanone may be increased to as high as 90% compared to about 74% as the maximum while employing a manganese acetate catalyst but in the absence of an alkaline earth metal salt. Generally, from 0.01 to 0.2% of manganese acetate, based upon the weight of the solvent, may be used, although preferably from .05 to 0.07% is employed.

I have further found that the ratio of alkaline earth metal salt to manganese acetate used in this oxidation process may vary over a fairly wide range such as from 0.5 to 1 to as high as 3.0 to 1. although the best yields have been found when employing an alkaline earth salt such as barium acetate with manganese acetate in a weight ratio of about 2.5 to 1.

The mechanism of the oxidation of ketones to acids is not fully known. Some facts, however, have been established in the case of cyclohexanone oxidation which may be helpful in clarifying the advances obtained according to the present invention. I do not wish to be limited, however, by the explanation of these facts, which follows:

When cyclohexanone is oxidized under the conditions described according to the present invention, oxidation occurs with rupture at the carbonyl group and the principal product is adipic acid. At least a part of the cyclohexanone is converted to an intermediate aldehyde-acid,

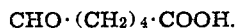

$$CHO \cdot (CH_2)_4 \cdot COOH.$$

Aliphatic acids and dibasic acids with less than 6 carbon atoms are also generally found in the crude oxidation product and during the formation of the acids of less than 6 carbon atoms. carbon dioxide is evolved. Extensive carbon dioxide evolution is, therefore. a criterion of too violent oxidation. The intermediate aldehyde-acid is, however. potential adipic acid. It is apparently very sensitive to conditions and requires a mild catalyst for oxidation to adipic acid.

I believe the alkaline earth salts favorably soften the action of the manganese acetate catalyst thus permitting the intermediates to be oxidized without breaking the carbon chain. In the crude product the intermediate analyzes as carbonyl and thus is conveniently classified as unreacted cyclohexanone. When this custom is followed, yields have been designated as "apparent yields." On the other hand, when yields are based on adipic acid and unconverted cyclohexanone actually recovered they are designated as "actual yields." In any case when the concentration of the intermediate aldehyde-acid is high, it is quite possible to increase "actual yield" by oxidizing to a higher conversion. "Apparent yield" (based on adipic acid recovered plus the intermediate aldehyde acid plus unreacted cyclohexanone) may be higher than any "actual yield" attainable, but in all probability it quite nearly approaches the maximum "actual yield" which may be obtained with a catalyst of optimum effectiveness in oxidizing both the intermediates and the cyclohexanone itself.

Although the oxidation of ketones to acids may be carried out at pressures above atmospheric, I prefer to use atmospheric pressure and temperatures of 75 to 85° C., although the wider range of 60 to 100° C. may be employed if desired. In commencing the reaction, I prefer to use about 30% cyclohexanone in admixture with a solvent such as hereinafter described, although from 5 to 95% cyclohexanone may be employed successfully.

I have found that the yields in final product produced according to my invention may be considerably increased by carrying on the oxidation in the presence of a solvent for the ketones. Various liquids substantially inert to the oxidation and capable of dissolving the ketones such as carbon tetrachloride and benzene may be used, but I prefer to use as the solvent an organic acid such as acetic, propionic, butyric, isobutyric, trimethyl acetic and such aromatic acids as phenyl acetic, such hydroxy acids or derivatives as methoxy acetic and the like. Varying proportions of these acids, based upon the weight per cent present of the ketone being oxidized may be utilized, such as 5 to 95% by weight although I prefer to utilize about 70%. Within these indicated ranges, I have found that the solvents effect a considerable increase in the yield of dibasic acid obtained by the oxidation of the ketone.

The following examples illustrate how the invention may be practiced:

EXAMPLE

Into an aluminum vessel of 4000 cc. capacity, provided with suitably valved gas outlet and inlet lines at top and bottom, there was charged 2000 grams of a mixture containing 600 grams of cyclohexanone, 1397 grams acetic acid and 0.066% manganese acetate and 0.155% barium acetate, based upon the weight of acetic acid. This mixture was heated to 80° C. and air was introduced through the inlet line at the base of the reaction vessel at a space velocity of 274 (by space velocity is meant the volume of air per volume of liquid per hour at standard temperature and pressure), for 3 hours at atmospheric pressure and at a temperature of 80° C. Reaction product was removed from the reaction vessel and adipic acid recovered by cooling the final product to crystallize the adipic acid.

Adipic acid was synthesized at the rate of 45.9 grams per hour. The conversion of cyclohexanone to adipic acid was 31.6% and the actual yield of cyclohexanone to adipic acid was 59.0%. By "conversion" it is meant that fraction of the raw material which is converted to adipic acid. "Yield" is the molal percentage of reacted cyclohexanone which appears as adipic acid.

In Table I which follows are given the results of a series of tests which combine data showing the actual yields when using manganese acetate alone and when using manganese acetate in combination with barium acetate.

Table I

| 80° C. | Actual yields | | | |
|---|---|---|---|---|
| | 0.062-0.068% MnAc₂ | | 0.066% MnAc₂ +0.155% BaAc₂ | |
| | Conversion | Yield | Conversion | Yield |
| | 32.0 | 57.0 | 30.8 | 60.2 |
| | 38.6 | 59.4 | 41.2 | 64.8 |
| | 44.6 | 63.0 | 43.3 | 64.0 |
| | 58.4 | 61.6 | 48.7 | 65.8 |
| | | | 50.5 | 67.2 |
| | | | 59.4 | 70.4 |

From these examples it is evident that at comparable conversions higher yields are obtained in every case where barium acetate (BaAc₂) is employed. It is also evident that the yield with manganese acetate (MnAc₂) alone has reached a maximum somewhere between 45–58% conversion. In the presence of barium acetate, yields continue to rise as conversion rises. This phenomenon can be easily explained by assuming that the barium acetate has softened the activity of the manganese acetate catalyst to permit conversion of the aldehyde intermediate to adipic acid without appreciable breakdown of the 6 carbon atom chain.

The effect of varying concentrations of barium acetate upon the yield of acid at various conversions is illustrated by the following table which represents the results obtained when operating according to the broad disclosure of the example, i. e. at 80° C. and at a constant manganese acetate concentration of 0.04%. The yields as given in Table II are apparent yields based on chemical analyses.

Table II

| Run | 36 | 20 | 23 | 42 | 33 |
|---|---|---|---|---|---|
| Percent BaAc₂ | None | 0.020 | 0.020 | 0.020 | 0.10 |
| Conversion, percent | 42.7 | 42.7 | 45.8 | 45.8 | 40.4 |
| Yield, percent | 74.2 | 79.3 | 79.1 | 79.1 | 80.4 |

Various changes may be made in the methods and details of this invention without departing therefrom or sacrificing any of the advantages thereof.

I claim:

1. A process for the catalytic oxidation of ketones which comprises subjecting a ketone corresponding to the general formula, $RCOR_1$, in which R denotes an alkyl, cycloalkyl, aralkyl or aryl radical and $R_1$, an alkyl cycloalkyl or aralkyl radical, or in which R and $R_1$ are connected with each other as members of a non-aromatic ring system, to oxidation in the liquid phase, in the presence of a solvent for the ketone, by means of a gas containing oxygen, in the presence of a catalyst comprising a mixture of manganese and barium acetates.

2. A process for the catalytic oxidation of ketones which comprises subjecting a ketone corresponding to the general formula, $RCOR_1$, in which R denotes an alkyl, cycloalkyl, aralkyl or aryl radical and $R_1$, an alkyl, cycloalkyl or aralkyl radical, or in which R and $R_1$ are connected with each other as members of a non-aromatic ring system, to oxidation in the liquid phase, at a temperature of from 60 to 100° C., in the presence of from 5 to 95% by weight of a solvent for the ketone, based upon the weight of the ketone, by means of a gas containing oxygen and in the presence of a catalyst comprising a mixture of from 0.01 to 0.2% by weight of manganese acetate and from 0.5 to 1 to 3.0 to 1 part of barium acetate per part of manganese acetate.

3. A process for the catalytic oxidation of cyclohexanone which comprises subjecting cyclohexanone to oxidation in the liquid phase, in the presence of a solvent for the ketone by means of a gas containing oxygen, in the presence of a catalyst comprising a mixture of manganese and barium acetates.

4. A process for the catalytic oxidation of cyclohexanone which comprises subjecting cyclohexanone to oxidation in the liquid phase, at a temperature of from 60 to 100° C., in the presence of from 5 to 95% by weight of a solvent for the ketone, based upon the weight of the ketone, by means of a gas containing oxygen and in the presence of a catalyst comprising a mixture of from 0.01 to 0.2% by weight of manganese acetate and from 0.5 to 1 to 3.0 to 1 part of barium acetate per part of manganese acetate.

WILLIAM J. AMEND.